(12) United States Patent
Nakajima

(10) Patent No.: US 10,218,866 B2
(45) Date of Patent: Feb. 26, 2019

(54) ELECTRONIC APPARATUS WITH A PAIR OF PROXIMITY SENSORS EACH WITH A PLURALITY OF SENSOR SEGMENTS

(71) Applicant: Mikio Nakajima, Kanagawa (JP)

(72) Inventor: Mikio Nakajima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/649,752

(22) Filed: Jul. 14, 2017

(65) Prior Publication Data

US 2018/0041655 A1 Feb. 8, 2018

(30) Foreign Application Priority Data

Aug. 3, 2016 (JP) .................................. 2016-152406

(51) Int. Cl.
| | | |
|---|---|---|
| *H04N 1/00* | (2006.01) | |
| *G03G 15/00* | (2006.01) | |
| *G06F 1/32* | (2006.01) | |
| *G06K 9/00* | (2006.01) | |

(52) U.S. Cl.
CPC ..... *H04N 1/00896* (2013.01); *G03G 15/5004* (2013.01); *G06F 1/3231* (2013.01); *G06K 9/00624* (2013.01); *H04N 1/00891* (2013.01)

(58) Field of Classification Search
CPC ........... H04N 1/00896; H04N 1/00891; G03G 15/5004; G06F 1/3231; G06K 9/00624
See application file for complete search history.

(56) References Cited

U.S. PATENT DOCUMENTS

| 2010/0231390 | A1* | 9/2010 | Hashimoto | G03G 15/5004 340/573.1 |
|---|---|---|---|---|
| 2012/0326038 | A1* | 12/2012 | Yamashina | G03G 15/5004 250/338.3 |
| 2012/0327458 | A1* | 12/2012 | Baba | G03G 15/5004 358/1.15 |
| 2013/0073887 | A1* | 3/2013 | Miki | G06F 1/3231 713/323 |
| 2015/0006927 | A1* | 1/2015 | Ono | G06F 1/3231 713/320 |
| 2015/0177817 | A1* | 6/2015 | Badri | G06F 1/3268 713/320 |
| 2016/0265965 | A1* | 9/2016 | Miura | G01J 1/4228 |
| 2017/0001311 | A1* | 1/2017 | Bushman | B25J 9/1666 |

FOREIGN PATENT DOCUMENTS

| JP | 2013-007980 | 1/2013 |
|---|---|---|
| JP | 2017-058764 | 3/2017 |

* cited by examiner

*Primary Examiner* — Sandra Brase
(74) *Attorney, Agent, or Firm* — Oblon, McClelland, Maier & Neustadt, L.L.P.

(57) ABSTRACT

An electronic apparatus includes a first proximity sensor and a second proximity sensor. The first proximity sensor and a second proximity sensor are arranged adjacent to each other in a horizontal direction. The first proximity sensor and a second proximity sensor have detection ranges that overlap at a distance from a middle point between an imaginary line connecting the first proximity sensor and the second proximity sensor in a perpendicular direction in relation to a front surface of the electronic apparatus.

11 Claims, 5 Drawing Sheets

ELECTRONIC APPARATUS WITH A PAIR OF PROXIMITY SENSORS EACH WITH A PLURALITY OF SENSOR SEGMENTS

CROSS-REFERENCE TO RELATED APPLICATION

This patent application is based on and claims priority pursuant to 35 U.S.C. § 119(a) to Japanese Patent Application No. 2016-152406, filed on Aug. 3, 2016, in the Japan Patent Office, the entire disclosure of which is hereby incorporated by reference herein.

BACKGROUND

Technical Field

The embodiments of the present disclosure relate to an electronic apparatus.

Related Art

An electronic apparatus such as an image forming apparatus that "wakes up", i.e., returns from a power save mode to a standby mode when a proximity sensor senses a human body is known. In such an electronic apparatus, a wide sensor detection range is desired so that the proximity sensor can sense a user approaching from any direction.

SUMMARY

A novel electronic apparatus includes a first proximity sensor and a second proximity sensor, arranged adjacent to each other in a horizontal direction in relation to a floor where the electronic apparatus is provided. The first proximity sensor and the second proximity sensor have overlapping detection ranges that overlap at a distance from a middle point between an imaginary line connecting the first proximity sensor and the second proximity sensor in a perpendicular direction in relation to a front surface of the electronic apparatus.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

DETAILED DESCRIPTION

Figure 1:
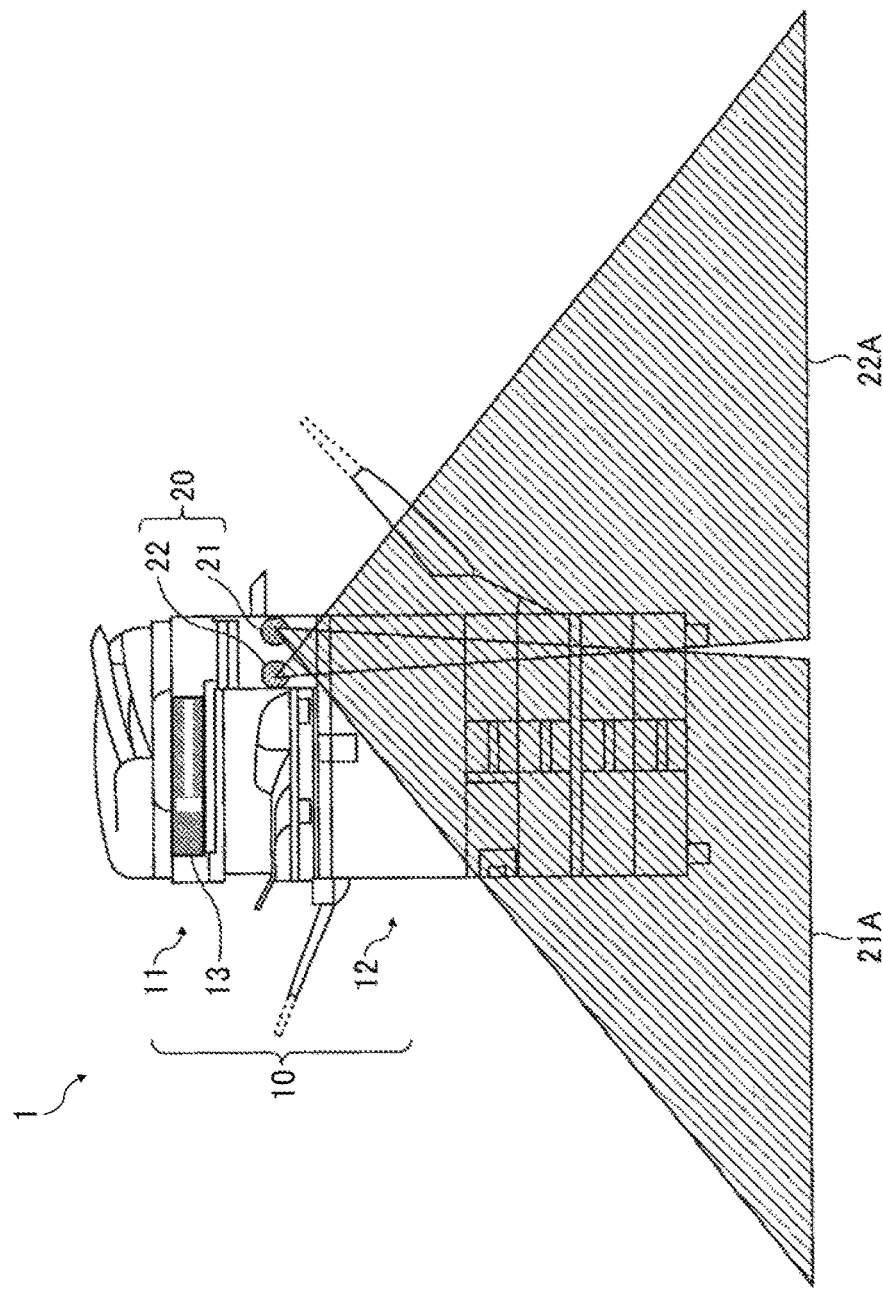
FIG. 1 is a diagram illustrating an overall configuration of an image forming apparatus according to embodiments of the present disclosure.

The terminology used herein is for describing particular embodiments only and is not intended to be limiting of the present disclosure. As used herein, the singular forms "a", "an" and "the" are intended to include the plural forms as well, unless the context clearly indicates otherwise. It will further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Embodiments of the present disclosure are described in detail with reference to the drawings. Like reference numerals designate identical or corresponding components throughout the several views and a description of same is omitted.

In this disclosure, an image forming apparatus is used as an example of an electronic apparatus to be described, in which a user approaches to operate the image forming apparatus, however is not the limiting of the disclosure. However, the electronic apparatus may be any other type of electronic apparatus, such as a projector, an electronic white board, or a digital signage, in which a user approaches to operate.

Image Forming Apparatus

FIG. 1 is a diagram illustrating an overall configuration of an image forming apparatus according to the embodiment. As illustrated in FIG. 1, the image forming apparatus 1 is for example, a multifunction peripheral (MFP), and includes a frame 10 and a set of proximity sensors 21 and 22 (hereinafter, collectively referred to as proximity sensor 20) attached to the frame 10.

The frame 10 is set on the floor, and houses a scanner 11, an image forming device 12, and a control panel 13. The scanner 11 reads a document image and performs digital signal processing on image data obtained by reading the document image. The image forming device 12 forms an image using the image data of the document image read with the scanner 11 on a recording sheet to be output. The control panel 13 is operated by a user to set conditions for reading and outputting the document image, while displaying information on the image forming apparatus 1. The control panel 13, namely, functions as a user interface.

The proximity sensor 20 includes a first proximity sensor 21 and a second proximity sensor 22. The first proximity sensor 21 and the second proximity sensor 22 are, for example, pyroelectric sensors that detect infrared rays using the pyroelectric effect. The first proximity sensor 21 and the second proximity sensor 22 are arranged adjacent to each other in a horizontal direction in relation to the floor, on which the frame 10 is provided. A detection range 21A of the first proximity sensor 21 and a detection range 22A of the second proximity sensor 22 overlap, as illustrated in FIG. 1.

Figure 2:
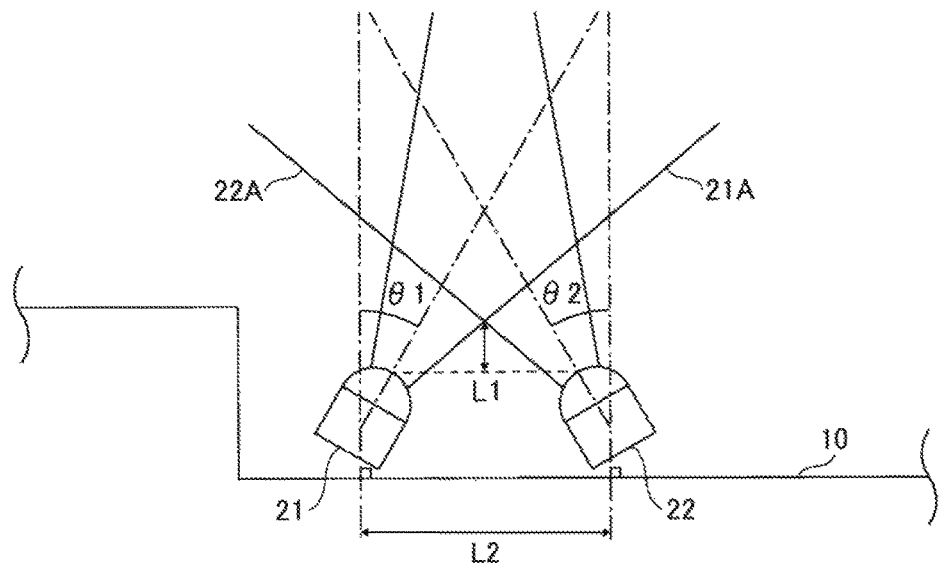
FIG. 2 is an illustration of an example of an arrangement of proximity sensors according to one embodiment of the present disclosure.

FIG. 2 is a schematic diagram illustrating an example of arrangement of proximity sensor 20 according to the embodiment of the present disclosure. In FIG. 2, the first proximity sensor 21 and the second proximity sensor 22 are viewed from above of the image forming apparatus 1. As illustrated in FIG. 2, the first proximity sensor 21 and the second proximity sensor 22 are arranged in a manner that the detection range 21A of the first proximity sensor and the detection range 22A of the second proximity sensor 22 overlap at a first distance L1 from a middle point on an imaginary line connecting the first proximity sensor 21 and the second proximity sensor 22, in a perpendicular direction in relation to a front surface of the frame 10. The first distance L1 is the distance from above-mentioned middle point to a point where the detection range 21A of the first proximity sensor and the detection range 22A of the second proximity sensor 22 overlap with the angles θ1 and θ2. More specifically, as illustrated in FIG. 2, the first proximity sensor 21 is installed on the front surface of the frame 10 inclined by a fint angle θ1 from a perpendicular direction in relation to the front surface of the frame 10 to a side where the second proximity sensor 22 is disposed. The second proximity sensor 22 is installed on the front surface of the frame 10 so as to be inclined by a second angle θ2 from a perpendicular direction in relation to the front surface of the frame 10 to a side where thy first proximity sensor 21 is disposed. Additionally, the second proximity sensor 22 is installed on the front surface of the frame 10 so as to have a second distance L2 from the first proximity sensor 21, as illustrated in FIG. 2. That is, the first proximity sensor 21 and the second proximity sensor 22 are installed on the front surface of the frame 10 separated by the second distance L2 therebetween.

The second distance L2, the first angle θ1, and the second angle θ2 set the detection range 21A of the first proximity sensor 21 and the detection rage 22A of the second proximity sensor 22 so as to overlap at the first distance L1 from the middle point. More specifically, the second distance L2, the first angle θ1, and the second angle θ2 are defined according to a horizontal viewing angle of the first proximity sensor 21 and the second proximity sensor 22. When the horizontal viewing angle of the first proximity sensor 21 and the second proximity sensor 22 is narrow, the second distance L2 is preferably extended to enlarge the first angle θ1 and the second angle θ2 in a range that the detection range 21A of the first proximity sensor 21 and the detection range 22A of the second proximity sensor 22 overlap at the first distance L1. This results in enlargement of an overall detection range. Here, the first angle θ1 and the second angle θ2 may be the same or different from each other.

Figure 3:
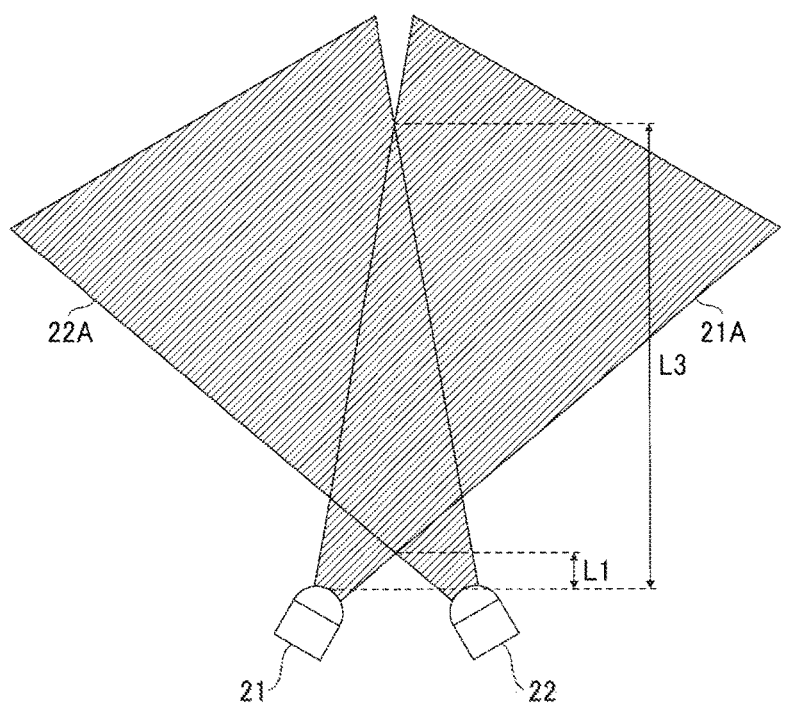
FIG. 3 is an illustration of an example of the arrangement of the proximity sensors according to the embodiment of the present disclosure.

The first distance L1 may be determined according to a function of the image forming apparatus 1. FIG. 3 is another schematic diagram illustrating an example of the arrangement of the proximity sensor 20 according to the embodiment of the present disclosure. In FIG. 3, the first proximity sensor 21 and the second proximity sensor 22 are viewed from the above of the frame 10.

For example, if the proximity sensor 20 is to be in use only when the image forming apparatus 1 returns to a standby mode from a power save mode, the proximity sensor 20 need only detect a user being in proximity to the image forming apparatus 1 at least once, and thus the first distance L1 may set to be relatively far from the image forming apparatus 1.

Accordingly, the first distance L1 is preferably extended by extending the second distance L2 or reducing one or both of the first angle θ1 and the second angle θ2. This extends a third distance L3 in FIG. 3, and the user approaching the image forming apparatus can be sensed in an early phase.

In addition, for example, when the proximity sensor 20 is in use in returning from the power save mode to the standby mode and in transitioning from the standby mode to the power save mode, the proximity sensor 20 should detect the user walking away from the image forming apparatus 1 after using the image forming apparatus 1. Considering this, the first distance L1 is preferably shortened by reducing the second distance L2 or enlarging one or both of the first angle θ1 and the second angle θ2. At this time, the second distance L2, the first angle θ1, and the second angle θ2 are defined in a manner that the third distance L3 is equal to or more than a predetermined distance with which the user approaching to the image forming apparatus 1 can be sensed, and the first distance L1 is equal to or less than a predetermined distance with which the user walking away from the image forming apparatus can be sensed.

Figure 4:
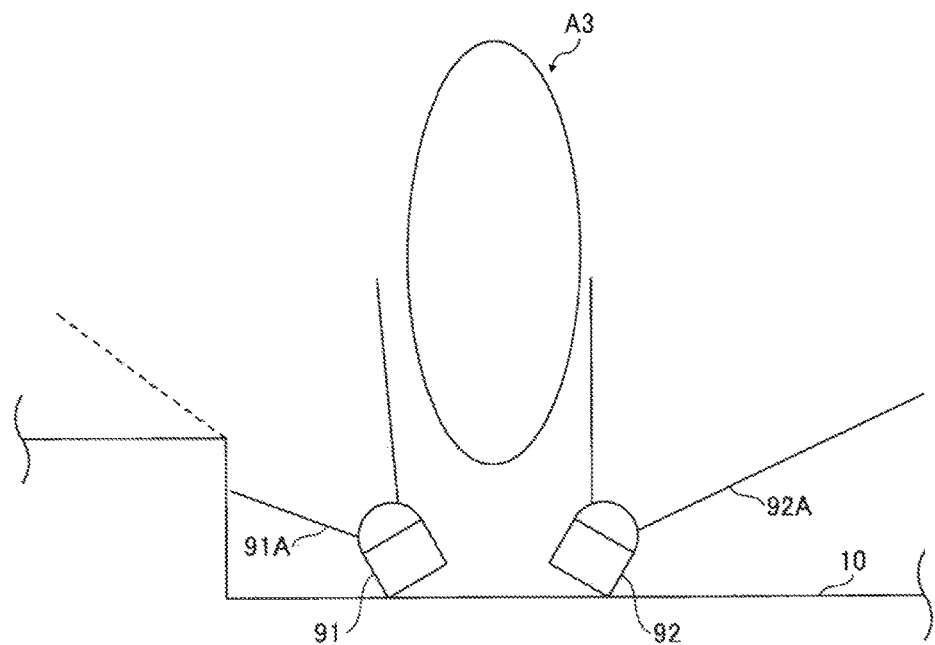
FIG. 4 is an illustration of arrangement of proximity sensors according to a comparative example.

FIG. 4 is a schematic diagram illustrating an arrangement of proximity sensors according to a conmarative example. In FIG. 4, two proximity sensors 91 and 92 are viewed from above the apparatus. As illustrated in FIG. 4, the two proximity sensors 91 and 92 are provided on the front surface of the frame 10 to face outward. With this arrangement, a detection range 91A of the proximity sensor 91 and a detection range 92A of the proximity sensor 92 do not overlap at a center part of a front of the apparatus, resulting in an area where the proximity sensors 91 and 92 cannot detect the infrared rays (area A3 in FIG. 4). Additionally, if there is a section that is projected from the surface of the frame 10 where the proximity sensors 91 and 92 are attached, fields of view of the proximity sensors 91 and 92 are easily interrupted. In FIG. 4, a case where a part of the field of view of the proximity sensor 91 is interrupted by a projecting section of the frame 10 and the detection range 91A of the proximity sensor 91 is narrower than a case without the projecting section is illustrated.

By contrast, according to the embodiment described above, the first proximity sensor 21 and the second proximity sensor 22 are provided on the front surface of the frame 10 as illustrated in FIG. 2 so that there is no area in front of the frame 10 where the proximity sensor 20 cannot detect infrared rays. In addition, compared to the comparative example, in which the two proximity sensors 91 and 92 are provided on the front surface of the apparatus so as to face outward, the fields of view of the first proximity sensor 21 and the second proximity sensor 22 are not interrupted by any projecting section of the frame 10. This configuration provides greater flexibility in the disposition of the first proximity sensor 21 and the second proximity sensor 22.

Figure 5:
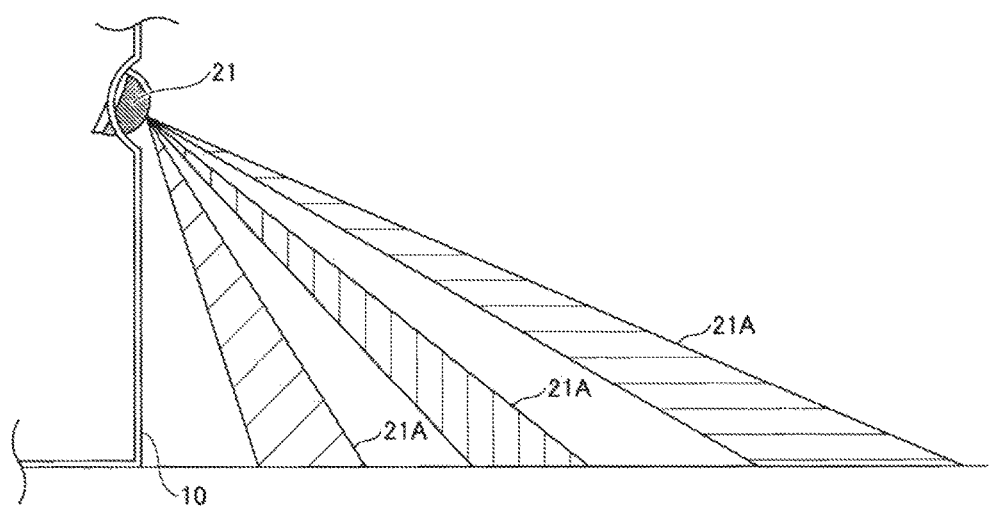
FIG. 5 is an illustration of another example arrangement of the proximity sensor according to the embodiment.

FIG. 5 is an illustration of another example of arrangement of the proximity sensor 20 aceording to the embodiment. FIG. 5 is a schematic diagram illustrating the image forming apparatus 1 viewed from a side. As illustrated in FIG. 5, the first proximity sensor 21 is preferably installed so as to project from the front surface of the frame 10. This prevents the first proximity sensor 21 from being interrupted in its field of view with the frame 10, resulting in enlargement of the detection range 21A of the first proximity sensor 21.

Proximity Sensor

A detailed description of the proximity sensor 20 is given below using the first proximity sensor 21 as an example. The second proximity sensor 22 may also, but need not, have the same configuration as the first proximity sensor 21.

Segments of the proximity sensor 20 are deseribed below. The segments, here, are areas each formed for projecting one of a plurality of detection ranges, on a Fresnel lens or the like.

Figure 6:
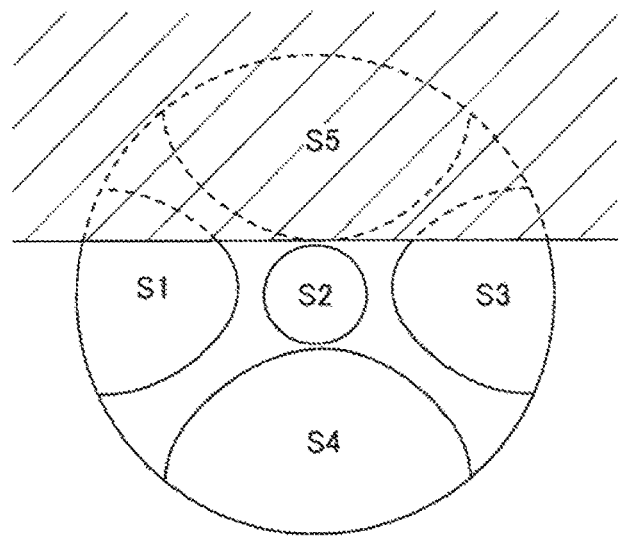
FIG. 6 is an illustration of segments of the proximity sensor.
Figure 7:
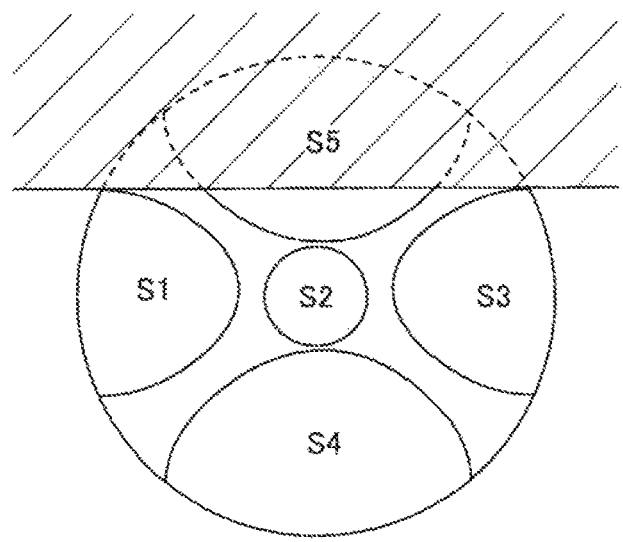
FIG. 7 is another illurstration of the segments of the proximity sensor.

FIG. 6 and FIG. 7 are diagrams illustrating examples of the segments of the first proximity sensor 21. In FIG. 6 and FIG. 7, the first proximity sensor 21 includes five segments S1, S2, S3, S4, and S5. In FIG. 6 and FIG. 7, the segment S1, the segment S2, and segment S3 are arranged in a horizontal direction. Additionally, the segment S5, the segment S2, and the segment S4 are arranged in a perpendicular direction. A side where the segment S5 is formed is an upper side of the first proximity sensor 21 (or the image forming apparatus 1), and another side where the segment S4 is formed is a bottom side of the first proximity sensor 21 (or the image forming apparatus 1). Areas indicated with oblique lines in FIG. 6 and FIG. 7 are akias that block the infrared rays.

For example, when the segments S1, S2, and S3 are required to sense a user at the first distance L1, the segment S5 formed above the segments S1, S2, and S3 is covered with a cover material to block the infrared rays, as illustrated in FIG. 6, so that the detection range of the first proximity sensor 21 may be limited to an obliquely downward area in relation to the horionatal surface. This causes the first proximity sensor 21 not to detect the infrared rays in a distance greater than the segments S1, S2, and S3, which are required to sense the user in the first distance L1, and prevents the first proximity sensor 21 from erroneously sensing a human body even if the human body is within an area where it is not required to detect a human body. At this time, as illustrated in FIG. 6. parts of the segments S1, S2, and S3 may be covered with the cover material, resulting in decrease of sensitivity of the sensor. To minimize detection errors and maintain high sensitivity, the segment S5 is preferably covered with the cover material in a manner that the segments S1, S2, and S3 are not covered, as illustrated in FIG. 7. At this time, a part of the segment S5 is not covered with the cover material. However, an amount of infrared rays to enter the segment S5 is small because the detection nange relation to the segment S5 is an area that is relatively far away, (for example around 10 meters) from the first proximity sensor 21 (or the image forming apparatus 1). Accordingly, false detections rarely occur even when the part of the segment S5 is not covered with the cover material.

Figure 8:
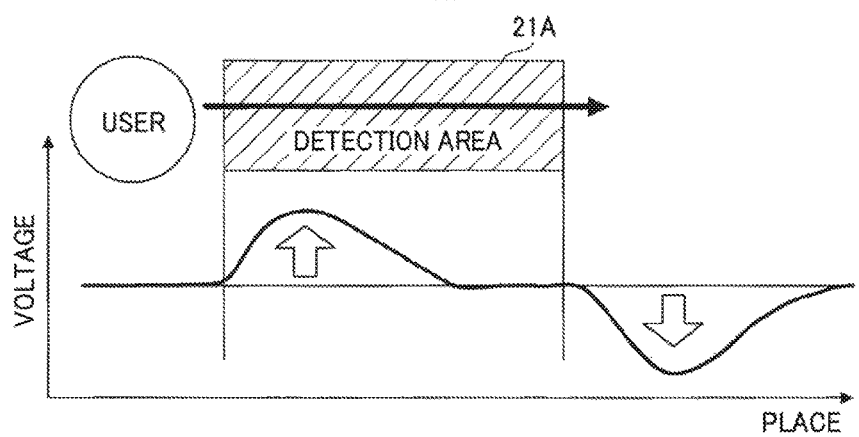
FIG. 8 is a diagram illustrating output of the proximity sensor according to a state of an object to be sensed.

FIG. 8 is a diagram illustrating output of the first proximity sensor 21 according to a state of an object to be sensed. In FIG. 8, the horizontal axis represents a place where a user is, and the vertical axis represents a voltage output from the first proximity sensor 21.

As illustrated in FIG. 8, when the user enters the detection range 21A of the first proximity sensor 21, an amount of infrared rays received with a pyrotieetric element configuring the first proximity sensor 21 changes, and a stable state changes due to electricity. For example, the output (voltage) front the first proximity sensor 21 becomes large, as illustrated in FIG. 8.

When the user stays within the detection range 21A after entering the detection range 21A, the pyroelectric element returns to the stable state again so that an output value of the first proximity sensor 21 is the same as when the user is not sensed. In addition, when the user leaves the detection range 21A, the amount of infrared rays received with the pyroeleetrie element changes, and the state of output is electrically changed from the stable state. For example, as illustrated in FIG. 8, the output value of the first proximity sensor 21 decreases.

Figure 9:
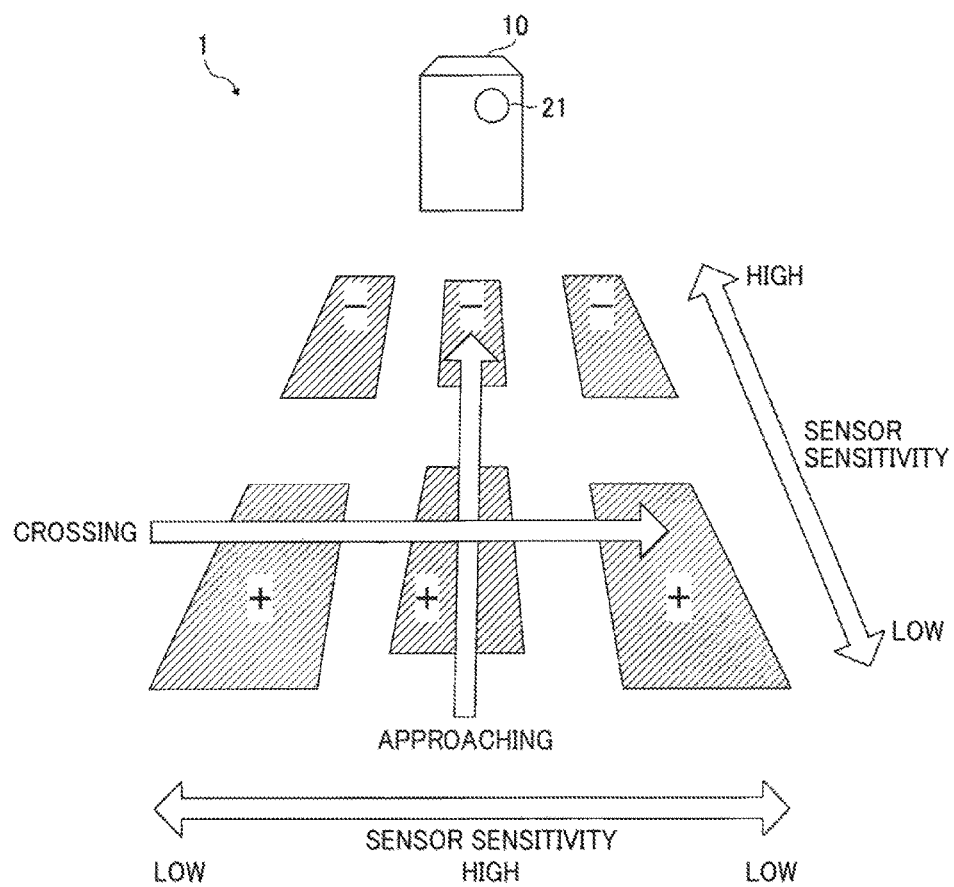
FIG. 9 is an illustration of a detection range of the proximity sensor.

FIG. 9 is an illustration of the detection range 21A of the first proximity sensor 21 to describe a detection range of a proximity sensor in general.

As illustrated FIG. 9, the first proximity sensor 21 has six detection areas indicated with oblique lines. A detection area is defined as an area where the first proximity sensor 21 detects the infrared rays emitted from a detection object. In FIG. 9, three areas of the detection range closer to the first proximity sensor 21 than the other three areas of the detection range are individually defined as a "detection range (−)", and the other three areas, which are far from the first proximity sensor 21 compared the above mentioned areas close to the first proximity sensor 21, are defined as a "detection range (+)".

When the first proximity sensor 21 senses the user in the detection range (+), the output value of the first proximity sensor 21 is large, as illustrated in FIG. 8. On the other hand, when the first proximity sensor 21 senses the user in the detection range (−), the output value of the first proximity sensor is small, as illustrated in FIG. 8.

When the user enters in the detection range, as illustrated in FIG. 9, of the image forming appanttus 1, which includes the first proximity sensor 21 and is in the power save mode, the image forming apparatus 1 returns form the power save mode in response to the change of the output value of the first proximity sensor 21 that senses the user. However, the user enters the detection range not only when the user uses the image forming apparatus 1, but also when the user simply passes in front of the image forming apparatus 1.

For example, as illustrated in FIG. 9, the user enters from the detection range (+) in the center and limiter to the detection range (−) in the center to close the image forming apparatus 1 if the user actually uses the image forming apparatus 1 (hereinafter, this action of the user is referred to as "approaching"). On the other hand, if the user doesn't use the image forming apparatus 1, but just passes in front of the image forming apparatus 1, the user walk across the three detection ranges (+) (hereinafter, this action of the user is referred to as "crossing").

When the first proximity sensor 21 senses the user who simply passes in front of the image forming apparatus 1 and the image forming apparatus returns from the power saving mode, the image forming apparatus 1 consumes an unnecessary power.

Regarding those detection areas of the first proximity sensor 21, each, has different sensitivity according to a distance from the first proximity sensor 21, namely the output value output when the user enters varies depending on where the detection area places. For example, as illustrated in FIG. 9, the closer the detection area is to the first proximity sensor 21 (image forming apparatus 1), the higher the sensor sensitivity is and larger the change of the output value output in response to an event of entrance of the user in the detection area.

Considering this, the image forming apparatus 1 according to the embodiments determines if the event is "approaching," or "crossing" based on the difference of the sensor sensitivity according to the distances from the first proximity sensor 21. If determining the event is "approaching", the image forming apparatus 1 returns from the power save mode.

As described above, the image forming apparatus 1 according to the embodiments includes the proximity sensor 20 including the two of the first proximity sensor 21 and the second proximity sensor 22 arranged in adjacent to each other in the horizontal direction in relation to the floor where the image forming apparatus 1 is provided on, in a manner that the detection range 21A and the detection range 22B overlap. The detection ranges 21A and 22A of the proximity sensor 20 including two of the first proximity sensor 21 and the second proximity sensor 22 are overlapped so as to overlap at a first distance L1 from the middle point on the line connecting the first proximity sensor 21 and the second proximity sensor 22 in a perpendicular direction in relation to the front surface of the image forming apparatus 1. This results in a wide range of the detection range in front of the image forming apparatus 1 where a human body can be sensed. Additionally, even when there is a section that is projecting from the surface old the frame 10 where the first proximity sensor 21 and the second proximity sensor 22 are installed, the fields of view of the first proximity sensor 21 and the second proximity sensor 22 are hardly interrupted with the projecting part. This enhances installation flexibility of the first proximity sensor 21 and the second proximity sensor 22.

In the description above, the first proximity sensor 21 is installed on the from surface of the frame 10 inclined by the first angle θ1 from to a perpendicular direction in relation to the front surface of the frame 10 in the side where second proximity sensor 22 is disposed, and the second proximity sensor 22 is installed on the front surface of the frame 10 so as to be inclined by the second angle θ2 from a perpendicular direction in relation to the front surface of the frame 10 in a side where the first proximity sensor 21 is disposed and the second distance L2 from the first proximity sensor 21. However, the embodiment is not limited to this. The first proximity sensor 21 and the second proximity sensor 22 may only be arranged in a manner that the detection range 21A of the first proximity sensor 21 and the detection range 22A of the second proximity sensor 22 overlap at the first distance L1 from the middle point on the line connecting the first proximity sensor 21 and the second proximity sensor 22 in a perpendicular direction in relation to a front surface of the frame 10. For example, the first proximity sensor 21 and the second proximity sensor 22 may be arranged in a manner that only one of the first proximity sensor 21 and the second proximity sensor 22 is disposed inclined by a predetermined angle to a direction where the other is disposed on the front surface of the frame 10 in perpendicular direction.

Although the embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for oath other within the scope of this disclosure and appended claims.

What is claimed is:

1. An electronic apparatus, comprising:
a first proximity sensor; and
a second proximity sensor, wherein the first proximity sensor and the second proximity sensor are arranged adjacent to each other in a horizontal direction,
wherein each proximity sensor of the first proximity sensor and the second proximity sensor includes a lens having a plurality of sensor segments so that each proximity sensor has a plurality of separate detection areas; and
wherein detection ranges of the first proximity sensor and the second proximity sensor overlap at a distance from a middle point between an imaginary line connecting the first proximity sensor and the second proximity sensor in a perpendicular direction in relation to a front surface of the electronic apparatus.

2. The electronic apparatus of claim 1, wherein the first proximity sensor is disposed inclined toward the second proximity sensor at a predetermined angle from the perpendicular direction in relation to the front surface of the electronic apparatus.

3. The electronic apparatus of claim 2, wherein the second proximity sensor is disposed inclined toward the first proximity sensor at a predetermined angle from the perpendicular direction in relation to the front surface of the electronic apparatus.

4. The electronic apparatus of claim 1, further comprising a cover material to cover a part of each of the first proximity sensor and the second proximity sensor to block infrared rays and limit each detection range to an obliquely downward area.

5. The electronic apparatus of claim 1, wherein the first proximity sensor and the second proximity sensor project from the front surface of the electronic apparatus.

6. The electronic apparatus of claim 1, wherein the first proximity sensor and the second proximity sensor are pyroelectric sensors that detect infrared rays using pyroelectricity.

7. The electronic apparatus of claim 1, wherein the electronic apparatus performs processing according to a user instruction being input directly to the electronic apparatus.

8. The electronic apparatus of claim 7, wherein the electronic apparatus is an image forming apparatus that forms an image according to the user instruction.

9. The electronic apparatus of claim 1, wherein each of the first and second proximity sensors includes a Fresnel lens.

10. The electronic apparatus of claim 1, wherein each of the first and second proximity sensors has five sensor segments, with three of the sensor segments being arranged in the horizontal direction.

11. The electronic apparatus of claim 1, wherein each of the first and second proximity sensors has six detection areas.

* * * * *